US007957855B2

(12) United States Patent  
Seo et al.

(10) Patent No.: US 7,957,855 B2
(45) Date of Patent: Jun. 7, 2011

(54) CONTROL SYSTEM FOR HYBRID VEHICLE (75) Inventors: Nobuhide Seo, Fuchu-cho (JP); Kei Yonemori, Fuchu-cho (JP)

(73) Assignee: Mazda Motor Corporation (JP)

( * ) Notice: Subject to any disclaimer, the term of this patent is extended or adjusted under 35 U.S.C. 154(b) by 958 days.

(21) Appl. No.: 11/892,339

(22) Filed: Aug. 22, 2007

(65) Prior Publication Data

US 2008/0051950 A1   Feb. 28, 2008

(30) Foreign Application Priority Data

Aug. 24, 2006 (JP) ................................ 2006-227725

(51) Int. Cl.
B60W 10/08 (2006.01)
B60L 11/08 (2006.01)
G06F 19/00 (2006.01)
(52) U.S. Cl. ........................................ 701/22; 180/65.2
(58) Field of Classification Search .................... 701/22, 701/1, 35; 180/65.2; 318/255
See application file for complete search history.

(56) References Cited

U.S. PATENT DOCUMENTS

| 3,842,287 | A * | 10/1974 | Nakamura | 290/16 |
| 6,687,581 | B2 * | 2/2004 | Deguchi et al. | 701/22 |
| 7,117,071 | B2 * | 10/2006 | Aoki et al. | 701/22 |
| 7,301,302 | B2 * | 11/2007 | Yoshii | 320/104 |
| 2003/0098185 | A1 | 5/2003 | Komeda et al. | |
| 2003/0146726 | A1 | 8/2003 | Ishikawa et al. | |
| 2004/0249525 | A1 * | 12/2004 | Okoshi et al. | 701/22 |

FOREIGN PATENT DOCUMENTS

| JP | 58-174089 A | 10/1983 |
| JP | 11-136808 A | 5/1999 |
| JP | 11-341607 A | 12/1999 |
| JP | 2002-218604 A | 8/2002 |
| JP | 2002-238104 A | 8/2002 |
| JP | 2004-096941 A | 3/2004 |
| JP | 2005-033886 | 2/2005 |
| WO | WO 2005/105511 | 11/2005 |

OTHER PUBLICATIONS

European Search Report Application EP 07 01 6472 dated Nov. 12, 2007.
European Search Report Application EP 07 016 472.8 dated Dec. 11, 2007.
Japanese Office Action "Notice of Reasons for Rejection" mailed on Oct. 20, 2009; Japanese Patent Application No. 2006-227725 with English Translation.

* cited by examiner

*Primary Examiner* — Tan Q Nguyen
(74) *Attorney, Agent, or Firm* — Studebaker & Brackett PC; Donald R. Studebaker

(57) ABSTRACT

A control system for a hybrid vehicle, which comprises member for determining a required output of a vehicle-driving motor in conformity to a required vehicle power, a member for determining a required output of a generator in conformity to the required output of the vehicle-driving motor, a member for determining a required output of an engine in conformity to the required output of the generator, a battery for storing an electric energy generated by the generator and charged thereinto through an inverter, and discharging the stored electric energy to the vehicle-driving motor through the inverter, and a member for, in response to occurrence of a waveform difference between a required current waveform of the vehicle-driving motor and an output current waveform of the generator due to a change in the required output of the vehicle-driving motor, to perform a waveform-difference correction operation in a direction for eliminating the waveform difference. The hybrid vehicle control system of the present invention can quickly eliminate a transitional waveform difference while achieving enhanced fuel economy.

4 Claims, 8 Drawing Sheets

CONTROL SYSTEM FOR HYBRID VEHICLE

BACKGROUND OF THE INVENTION

1. Field of the Invention

The present invention relates to a control system for a hybrid vehicle, and more particularly to a control system for a hybrid vehicle employing a series hybrid configuration in which an internal combustion engine is used solely for the purpose of driving a generator.

2. Background Art

Heretofore, there has been known a hybrid vehicle designed to be driven by a combination of a plurality of drive power sources adapted to be operated simultaneously or individually. A drive train for the hybrid vehicle includes one type called "series hybrid configuration". In this series hybrid configuration, an internal combustion engine (hereinafter referred to simply as "engine") is used solely for the purpose of driving a generator, and a direct drive of road wheels (i.e., driving road wheels) of the hybrid vehicle is performed only by a vehicle-driving motor. An electric energy generated by the generator is directly used for driving the vehicle-driving motor, or after being appropriately stored in a battery, extracted (discharged) from the battery according to need and supplied to the vehicle-driving motor.

For example, JP 2005-033886A discloses a control system for a hybrid vehicle employing a series hybrid configuration. In this system, a converter (a device for frequency/voltage conversion) and an inverter (a device for converting a direct current to an alternating current) are provided between a generator and a battery and between the battery and a vehicle-driving motor, respectively.

The frequency/voltage or DC-AC conversion using the converter or inverter or involves a problem about relatively large energy loss during the conversion. This energy loss will lead to deterioration in fuel economy.

As one of the measures to prevent such energy loss, a drive train may be designed to supply an AC energy generated by a generator, directly to a vehicle-driving motor (AC motor) without through a converter and an inverter. In this configuration, considering that the vehicle-driving motor for directly driving road wheels is essentially required to generate an output (i.e., vehicle power) complying with a driver's request (manipulation) including requests for vehicle acceleration and vehicle deceleration, an electric energy must be supplied to the vehicle-driving motor in conformity to the required vehicle power. Specifically, in the drive train designed to supply an AC energy generated by the generator, directly to the vehicle-driving motor, it is necessary to allow an output of the generator to have a current waveform (amplitude, frequency and phase) conforming to that required for the vehicle-driving motor.

Further, the required output of the vehicle-driving motor is frequently changed depending on vehicle running conditions, and the current waveform required for the vehicle-driving motor is changed accordingly. Therefore, the output (current waveform) of the generator has to be changed in response to the change in the required current waveform. In reality, the output of the generator is not always changed at a sufficiently-high response speed. For example, if a frequency of an alternating current required for the vehicle-driving motor is rapidly changed, a frequency of an output alternating current of the generator has to be responsively changed at a high speed. However, the frequency of the output alternating current of the generator is proportional to an engine speed, and thereby it is impossible to change the frequency at a higher speed than a change rate of the engine speed. Thus, if the engine speed is changed with a certain delay, a waveform mismatch (waveform difference) will occur in proportion to the delay.

The waveform difference is likely to cause difficulty in obtaining a required vehicle power (vehicle driving force), which leads to negative effects, such as torque shock. Therefore, there is the need for, in response to occurrence of such a waveform difference, eliminating the waveform difference as quickly as possible.

SUMMARY OF THE INVENTION

It is therefore an object of the present invention to provide a control system for a hybrid vehicle, capable of meeting the above need.

In order to achieve this object, the present invention provides a control system for a hybrid vehicle which includes a generator adapted to be driven by an internal combustion engine, and a vehicle-driving motor adapted to drive road wheels, and has a first electric energy supply mode for directly supplying an alternating current generated by the generator, to the vehicle-driving motor. The control system comprises required motor output determination section operable to determine a required output of the vehicle-driving motor in conformity to a required vehicle power, required generator output determination section operable to determine a required output of the generator in conformity to the required output of the vehicle-driving motor, required engine output determination section operable to determine a required output of the engine in conformity to the required output of the generator, and waveform-difference correction unit operable, in response to occurrence of a waveform difference between a current waveform required for the vehicle-driving motor and an output current waveform of the generator, due to a change in the required output of the vehicle-driving motor, to perform a waveform-difference correction operation in a direction for eliminating the waveform difference.

DESCRIPTION OF THE PREFERRED EMBODIMENTS OF THE INVENTION

Figure 1:
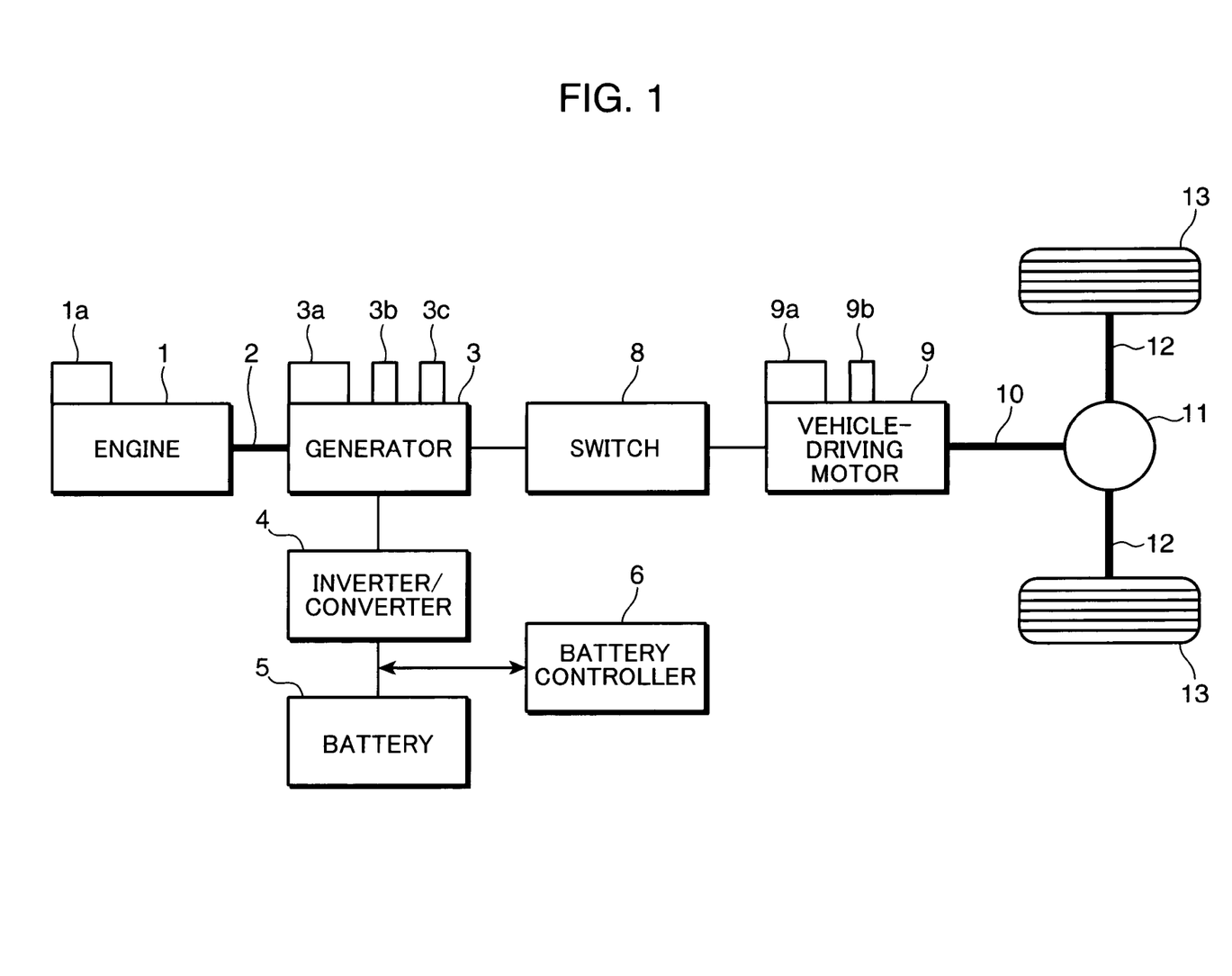
FIG. 1 is a block diagram showing a schematic configuration of a hybrid vehicle incorporating a control system according to one embodiment of the present invention.

With reference to the drawings, an embodiment of the present invention will now be described. FIG. 1 is a block diagram showing a schematic configuration of a hybrid vehicle incorporating a control system according to one embodiment of the present invention. The hybrid vehicle comprises an engine 1 which has a throttle valve 1a adapted to controllably reduce an intake air amount so as to serve as a means to adjust an engine output. The engine 1 has a crankshaft 2 as an output shaft which is mechanically connected to a generator 3. The generator 3 is adapted to be driven by the engine output received from the crank shaft 2 so as to generate a three-phase alternating current. The generator 3 is provided with a generator torque controller 3a for adjusting an amount of electric energy to be generated (or engine torque to be absorbed), a generator rotation angle sensor 3b for detecting a rotation angle of a rotor (not shown) as an input shaft thereof, and a generator current sensor 3c for detecting an amplitude (equivalent to magnitude) of an generated alternating current.

The generator 3 is electrically connected to a battery 5 through an inverter/converter 4. The inverter/converter 4 is a conversion device serving as both an inverter with a function of conversion between AC and DC and a converter with a function of frequency/voltage conversion.

The hybrid vehicle includes a battery controller 6 adapted to monitor an amount of electric energy stored (i.e., storage amount) in the battery 5 and control charging/discharging of the battery 5 (i.e., storing an electric energy in the battery 5/extracting the stored electric energy from the battery 5). In an operation of charging the battery 5, a part or entirety of AC generated by the generator 3 is converted to DC at a specified voltage through the inverter/converter 4, and then the converted DC is introduced into the battery 5. In an operation of discharging the battery, DC from the battery 5 is converted to an optimal AC waveform through the inverter/converter 4, and then the converted AC is supplied to the vehicle-driving motor 9 through the generator 3.

The generator is electrically connected to the vehicle-driving motor 9 through a switch 8. When the switch 8 is in its ON state, a current W1 to be supplied from the generator 3 to the vehicle-driving motor 9 is expressed by the following Formula (1) or (2):

$$W1=W2+W3 \quad \text{(Formula 1: during discharging of the battery)}$$

$$W1=W2-W4 \quad \text{(Formula 2: during charging of the battery)},$$

wherein W2 is an amount of electric energy generated by the generator 3;
W3 is an amount of electric energy discharged from the battery 5; and
W4 is an amount of electric energy charged into the battery 5.

The vehicle-driving motor 9 is adapted to convert supplied AC electric energy to rotational energy and output the rotational energy to a motor output shaft 10. The vehicle-driving motor 9 is provided with a motor torque controller 9a for controlling a current (amplitude, frequency, phase) to be supplied to the vehicle-driving motor 9, and a motor rotation angle sensor 9b for detecting a rotation angle of a rotor 91 (see FIG. 3) of the vehicle-driving motor 9. The motor torque controller 9a also serves as phase-angle setting means operable to setting a current phase angle θ of the vehicle-driving motor 9, as described in detail later.

The motor output shaft 10 is mechanically connected to a drive axle 12 and two road wheels 13 through a differential unit (including reduction gear unit).

As above, this hybrid vehicle employs a series hybrid configuration in which the engine 1 is used solely for the purpose of driving the generator 3, and a direct drive of the road wheels 13 is performed only by the vehicle-driving motor 9.

In this embodiment, as a mode of supplying electric energy to the vehicle-driving motor 9, the hybrid vehicle has a first electric energy supply mode and a second electric energy supply mode which are selectively switched therebetween depending on vehicle driving conditions. The first electric energy supply mode is configured to supply an electric energy generated by the generator 3, directly to the vehicle-driving motor 9 in principle. The first electric energy supply mode is selected when a required output of the vehicle-driving motor 9 is in a predetermined medium-to-high vehicle power range (hereinafter referred to as "first driving range").

The second electric energy supply mode is configured to discharge an electric energy stored in the battery 5, and supply the discharged electric energy to the vehicle-driving motor 9 through the inverter/converter 4 and the generator 3 (i.e., the same mode as that in a conventional electric vehicle). The second electric energy supply mode is selected when the required output of the vehicle-driving motor 9 is in a low vehicle power range relative to the first driving range (hereinafter referred to as "second driving range").

Figure 2:
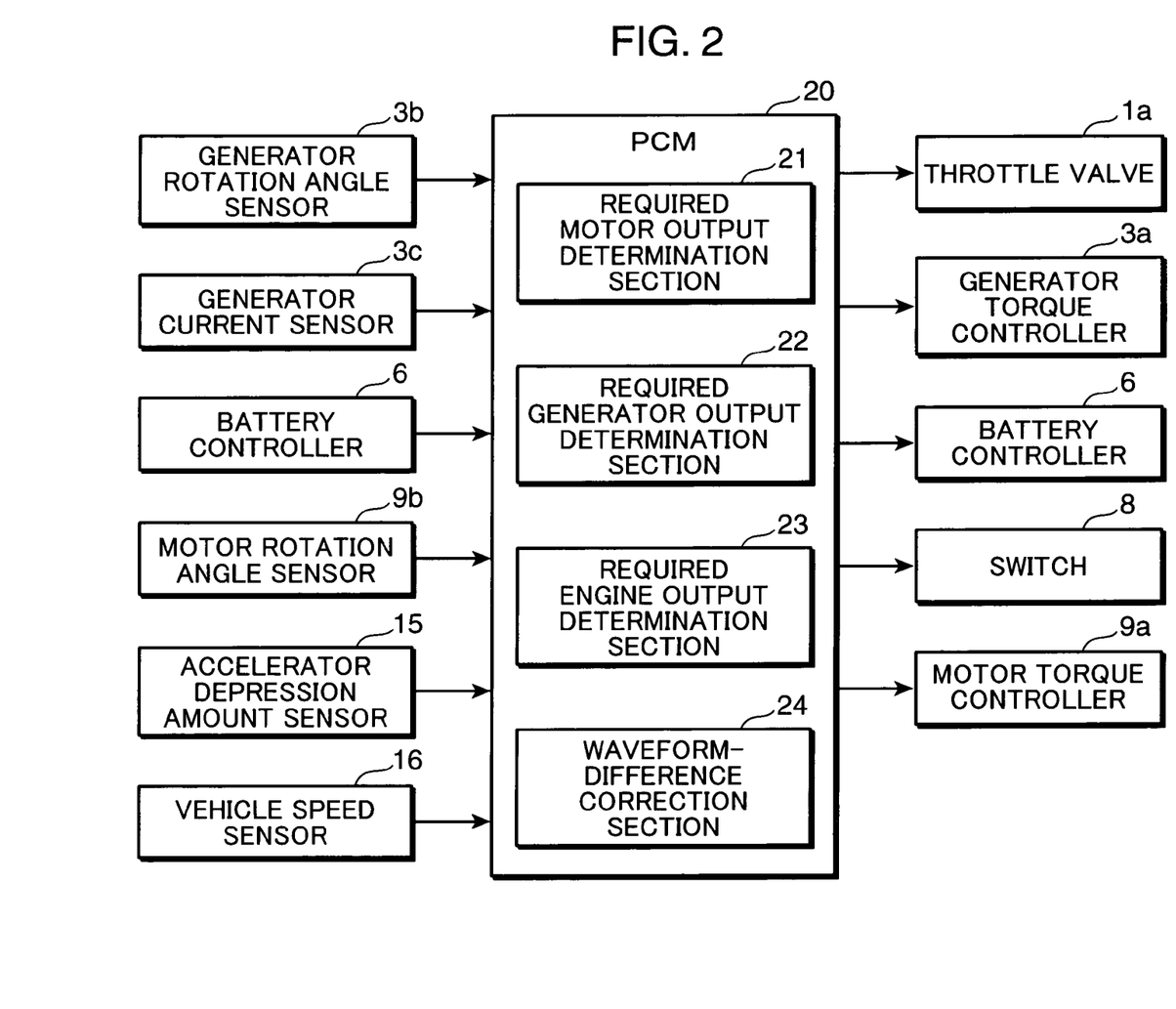
FIG. 2 is a schematic block diagram showing the control system of the hybrid vehicle.

FIG. 2 is a schematic block diagram showing the control system of the hybrid vehicle. A powertrain control module (PCM) 20 as a processing unit has an input terminal electrically connected with the generator rotation angle sensor 3b, the generator current sensor 3c, the battery controller 6 (which inputs a storage amount signal), the motor rotation angle sensor 9b, an accelerator depression amount sensor 15 for detecting an amount of accelerator depression by a driver, and a vehicle speed sensor 16 for detecting a vehicle speed. The PCM 20 has an output terminal connected to the throttle valve 1a (specifically, an actuator for opening and closing the throttle valve 1a) of the engine 1, the battery controller 6 (to which a charging/discharging command signal is output), the switch 8 and the motor torque controller 9a.

The PCM 20 is composed of a computer comprising a CPU, a ROM and a RAM. Specifically, the CPU is operable to perform a given processing with reference to input information from the above input elements and according to a program pre-stored in the ROM (or the RAM), and output a processing result as a driving signal to each of the above output elements.

As shown in FIG. 2, the PCM 20 functionally comprises a required motor output determination section 21, a required generator output determination section 22, a required engine output determination section 23 and a waveform difference correction section 24.

The required motor output determination section 21 (serving as required motor output determination means) is operable to determine a required output (including a required torque) of the vehicle-driving motor 9 in conformity to a required vehicle power. The required vehicle power is determined based on the amount of driver's accelerator depression (including a change rate thereof) detected by and input from the accelerator depression amount sensor 15 and the vehicle speed detected by and input from the vehicle speed sensor 16. For example, the required vehicle power may be determined by reading out a value from an experimentally-obtained and pre-stored correlation map of a required vehicle power and an accelerator depression amount/vehicle speed is and pre-stored, with reference to the input accelerator depression amount and vehicle speed.

The required generator output determination section 22 (serving as required generator output determination means) is operable to determine a required output of the generator 3. Particularly in the first electric energy supply mode, a current generated by the generator 3 is basically supplied directly to the vehicle-driving motor 9 while keeping a waveform of the generated current. Thus, the required generator output (generated current) is determined to have a current waveform conforming to that of a current required for the vehicle-driving motor 9 to obtain the required motor output.

The required engine output determination section 23 (required engine output determination means) is operable to determine a required output (torque, rotation speed) of the engine 1 in conformity to the required output of the generator 3. The rotation speed of the engine 1 has a proportional relation to a frequency of the generated current of the generator 3. Thus, particularly in the first electric energy supply mode, the rotation speed of the engine 1 (engine speed) is determined to have a value corresponding to the frequency of the required generator output.

The waveform difference correction section 24 is operable, in response to occurrence of a waveform difference between a current waveform required for the vehicle-driving motor 9 and an output current waveform of the generator 3 due to a change in the required output of the vehicle-driving motor 9, to perform a waveform-difference correction operation in a direction for eliminating the waveform difference. In terms of difference in methodology, the waveform-difference correction operation employed in this embodiment is classified into an electric energy amount correction operation of adjusting an amount of electric energy to be generated by the generator 3, a self-correction operation to be autonomously performed by the vehicle-driving motor 9, a charge/discharge-based correction operation based on charging/discharging of the battery 5, and a reset correction operation of momentarily stopping supply of electric energy to the vehicle-driving motor 9 and then restarting the supply. The waveform difference correction section 24 is operable to appropriately select one or more of these correction operations so as to achieve a desired waveform-difference correction, and perform a responsible part of the PCM 20 in each of the correction operations. The details of the correction operations will be described later.

In terms of a correction target, the waveform-difference correction operation is also classified into a current amplitude correction process and a current phase-difference correction process (including a current frequency correction process). The waveform difference correction section 24 is basically operable to perform the amplitude correction process and then perform the phase-difference correction process. In this embodiment, the electric energy amount correction operation is used as one methodology of the amplitude correction process, and a combination of any two or more of the self-correction operation, the charge/discharge-based correction operation and the reset correction operation is used as one methodology of the phase-difference correction process.

Figure 3:
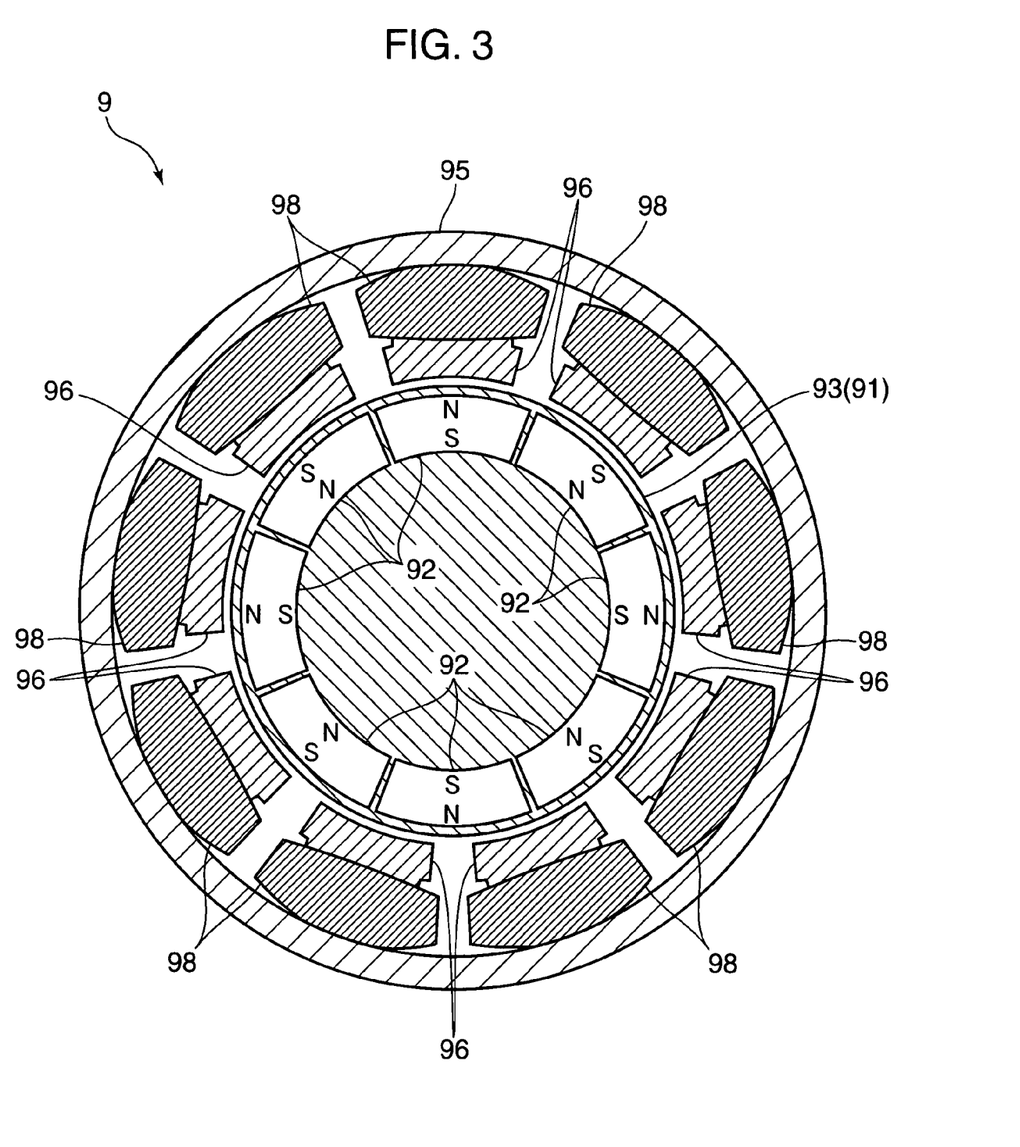
FIG. 3 is a cross-sectional view showing a vehicle-driving motor in the hybrid vehicle.

FIG. 3 is a cross-sectional view showing the vehicle-driving motor 9, taken along a plane perpendicular to an axis thereof. With reference to FIG. 3, the structure of the vehicle-driving motor 9 will be specifically described below. The vehicle-driving motor 9 is one type of AC motor generally called "interior permanent magnet (IPM) synchronous motor".

The vehicle-driving motor 9 comprises an approximately cylindrical-shaped case 95, and nine stators 96 each extending from an inner peripheral surface of the case 95 toward an axis of the vehicle-driving motor 9 (i.e., a center of the motor output shaft 10). Each of the stators 96 has a coil 98 wound therearound thereon in a concentric pattern.

The vehicle-driving motor 9 further includes a rotor 91 disposed concentrically with the case 95 and rotatably together with the motor output shaft 10. The rotor 91 is formed in an approximately columnar-shape, and a small gap is defined between an outer peripheral surface of the rotor 91 and respective distal ends of the stators 96. The rotor 91 comprises a major component consisting of a core 93, and eight permanent magnets 92 embedded in a portion of the rotor 91 adjacent to the outer peripheral surface thereof. Each of the permanent magnets 92 has opposite magnetic poles arranged in a radial direction of the case 95, and respective opposite magnetic poles of adjacent two of the permanent magnets 92 are reversely arranged.

Upon supplying a current to flow through the coil 98, the stator 96 becomes an electromagnet. Specifically, the distal ends of the stators 96 are magnetized with N or S pole. If respective ones of the stators 96 and the permanent magnets 92 have opposite magnetic poles when they are in opposed relation to each other, an attractive force will be exerted therebetween. Conversely, if they have the same magnetic poles, a repulsive force will be exerted therebetween. An alternating current is supplied to each of the coils 98, and therefore the distal end of the stator 96 is alternately magnetized with N and S poles, and a magnetic intensity of the stator 96 is changed every second. According to changes in magnetic field formed by the stators 96 and coils 98, the rotor 91 is rotated in a direction for increasing the attractive force and reducing the repulsive force. A torque arising from the attractive/repulsive forces between the electromagnets on the side of the stator 96 and the permanent magnets on the side of the rotor 91 is referred to particularly as "magnet torque".

As a feature of the IPM synchronous motor, in addition to the magnet torque, a torque called "reluctance torque" is generated in the rotor 91. The reluctance torque arises from an attractive force which is exerted on the core 93 of the rotor 91 by the electromagnets on the side of the stator 96. A plurality of portions of the core 93 located between the adjacent permanent magnets 92 (i.e., remaining portions of the core 93 after the permanent magnets are removed therefrom) are disposed to extend radially in cross-section, so that an intensity of attractive force acting on the radially-extending portions of the core 93 is changed depending on a rotation angle of the rotor 91. Thus, a value of reluctance torque is changed depending on changes in the magnetic field to be formed by the stator 96 and the coil 98 and in the rotation angle of the rotor 91.

Although not specifically illustrated, the generator 3 has fundamentally the same structure as that of the vehicle-driving motor 9. In the structure of the generator 3, the rotor 91 is integrally rotated together with the crankshaft 2 to generate a three-phase induced current in the coils 98.

Figure 4:
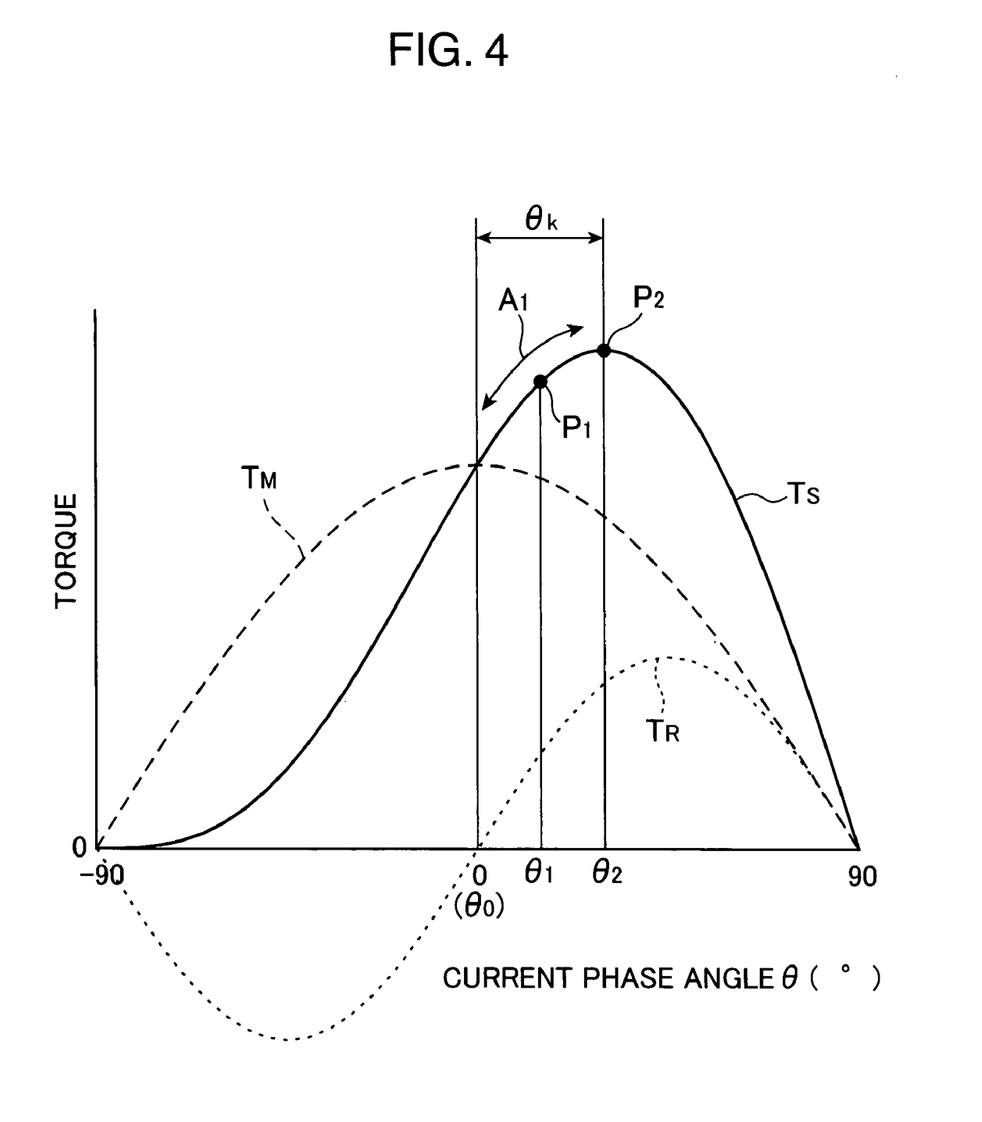
FIG. 4 is a graph showing characteristics of torque to be generated by the vehicle-driving motor.

FIG. 4 is a graph showing characteristics of torque to be generated by the vehicle-driving motor 9, wherein the horizontal axis represents a current phase angle $\theta$ (°), and the vertical axis represents a torque value. The current phase angle $\theta$ means a value indicative of a relative angular difference between a phase of a current supplied to the coils 98 and the rotation angle of the rotor 91. The motor torque controller 9a is operable to set the current phase angle $\theta$ at a predetermined value. In FIG. 4, a magnet torque TM and a reluctance torque TR at a certain current value are indicated by the broken line and the dotted line, respectively. Further, a motor torque TS which is a sum (total torque) of the magnet torque TM and the reluctance torque TR is indicated by the solid line.

As shown in FIG. 4, the magnet torque TM has a maximum value when the current phase angle $\theta=\theta_0$ (=0°), and a minimum value (=zero) when the current phase angle $\theta=-90°$ or 90°. The reluctance torque TR has a maximum value when the current phase angle $\theta=45°$, and a minimum value (negative value) when the current phase angle $\theta=-45°$. The reluctance torque TR becomes zero when the current phase angle $\theta=-90°$, 0° or 90°. The motor torque TS, i.e., the sum of the magnet torque TM and the reluctance torque TR, has a maximum value (point $P_2$) when the current phase angle $\theta=\theta 2$ ($0°<\theta_2<45°$), and becomes zero when the current phase angle $\theta=-90°$ or 90°.

Typically, the current phase angle θ has been set at $\theta_2$ for the point $P_2$ where the maximum torque is obtained. This current phase angle $\theta_2$ is also referred to as "optimal current phase angle". In this embodiment, the motor torque controller 9a is operable, in the second electric energy supply mode, to set the current phase angle θ at $\theta_2$ (in this embodiment, this angle will be referred to as "second phase angle $\theta_2$") as in the conventional manner. The characteristic of the motor torque TS is changed depending on a magnitude (amplitude) of the current, and the second phase angle $\theta_2$ will be changed accordingly. Thus, for example, after pre-storing mapped data of a current amplitude and a corresponding second phase angle $\theta_2$, in the PCM 20, the second phase angle $\theta_2$ may be determined by reading out a value from the mapped data, with reference to an actual current amplitude detected by and received from the generator current sensor 3c.

Differently from the conventional technique, in this embodiment, the motor torque controller 9a is operable, in the first electric energy supply mode, to set the current phase angle θ at $\theta_1$ ($\theta_0 < \theta_2 < \theta_2$) for a lower torque point $P_1$ relative to the point $P_2$, i.e., at a value less than $\theta_2$ by a predetermined value ($\theta_2-\theta_1$), instead of setting the current phase angle θ at θ2. In this embodiment, this current phase angle $\theta_1$ will be referred to specifically as "first phase angle $\theta_1$". Further, the angular range of $\theta_0$ to $\theta_2$ will be referred to specifically as "allowable phase angle range θk". The predetermined value ($\theta_2-\theta_1$) is a value which has been experimentally obtained and pre-stored in the waveform-difference correction section 24 in the form of mapped data or the like.

In the first electric energy supply mode where the current phase angle θ is set at the first phase angle $\theta_1$, if the current phase angle θ is deviated from the first phase angle $\theta_1$ within the allowable phase angle range θk, the motor torque TS will be increased or reduced depending a direction of the deviation (indicated by the arrow $A_1$ in FIG. 4). This characteristic allows the vehicle-driving motor 6 to perform a self-correction operation. The details of the self-correction operation will be described later.

An operation of the hybrid vehicle will be described below. In a first driving range where a power required for the vehicle (road wheels) (i.e., required vehicle power) is in a predetermined medium-to-high vehicle power range, the engine 1 is operated, and an engine output is input into the generator 3 through the crankshaft 2. Thus, the generator 3 generates a three-phase AC based on a mechanical rotational energy input from the crankshaft 2. The current generated by the generator 3 is supplied to the vehicle-driving motor 9 through the switch 8 (which is normally set in its ON state).

Then, the motor torque controller 9a adjusts a current phase angle θ of the current supplied to the vehicle-driving motor 9 to be set at the first phase angle $\theta_1$. By the action of the current flowing through the coils 98 and the rotor 92 having the permanent magnets 92 embedded in the core 93, the rotor 91 is rotated with a motor torque TS (a sum of a magnet torque TM and a reluctance torque TR).

A driving force obtained from the rotor 91 is output from the motor output shaft 10 and input into the differential unit 11. The differential unit 11 reduces a rotation speed from the motor output shaft 10, and outputs the torque to each of the right and left drive axles 12 while distributing the torque at a certain ratio depending on a difference in rotation speed between the drive axles 12. The road wheels 13 are rotationally driven by the torque received by the drive axles 12 to drive the vehicle.

When the required vehicle power is changed by manipulation of an accelerator pedal by a driver, the required motor output determination section 21 changes a required output of the vehicle-driving motor 9 in conformity to the changed required vehicle power. Then, the required generator output determination section 22 changes a required output of the generator 3 in conformity to the changed required motor output. Then, the required engine output determination section 23 changes a required output of the engine 1 in conformity to the changed required generator output. Thus, an opening degree of the throttle valve 1a is adjusted to allow an engine output to meet the required vehicle power, i.e., vehicle driving force.

In the above operation, if the required vehicle driving force is extremely rapidly changed, an output (current waveform) of the generator 3 is likely to have a response delay. For example, a frequency of a current required for the vehicle-driving motor 9 is rapidly changed, the generator 3 is required to rapidly change a frequency of an output current therefrom, in response to the change in the required current frequency of the vehicle-driving motor 9. However, a frequency of an output current of the generator 3 is proportional to a rotation speed of the engine 1 (i.e., engine speed), and therefore it is impossible to change the frequency at a higher speed than a change rate of the engine speed. Thus, if the engine speed is changed with a certain delay, a waveform mismatch (waveform difference) will occur in proportion to the delay.

The waveform difference is likely to cause difficulty in obtaining the required vehicle driving force, which leads to negative effects, such as torque shock. From this point of view, waveform correction means primarily made up of the waveform-difference correction section 24 is operable to perform a waveform correction operation for quickly eliminating the waveform difference. The following description will be made about specific elements of the waveform correction operation: the electric energy amount correction operation; the self-correction operation; the charge/discharge-based correction operation; and the reset correction operation.

The electric energy amount correction operation will first be described below. The electric energy amount correction operation is intended to correct only amplitude (i.e., magnitude of a current) in the waveform difference, and used in the amplitude correction process as the first step of the waveform-difference correction operation.

The electric energy amount correction operation is performed by correcting an amplitude of an output current of the generator to conform to an amplitude in a required current waveform of the vehicle-driving motor 9. Specifically, the waveform-difference correction section 24 instructs the generator torque controller 3a to adjust an electric energy to be generated by the generator 3 (or engine torque to be absorbed), while controlling the throttle valve 1a to adjust an engine torque.

The self-correction operation will be described below. The self-correction operation is autonomously performed by the vehicle-driving motor 9, and used as the phase-difference correction process in the second step of the waveform-difference correction operation.

Figure 5:
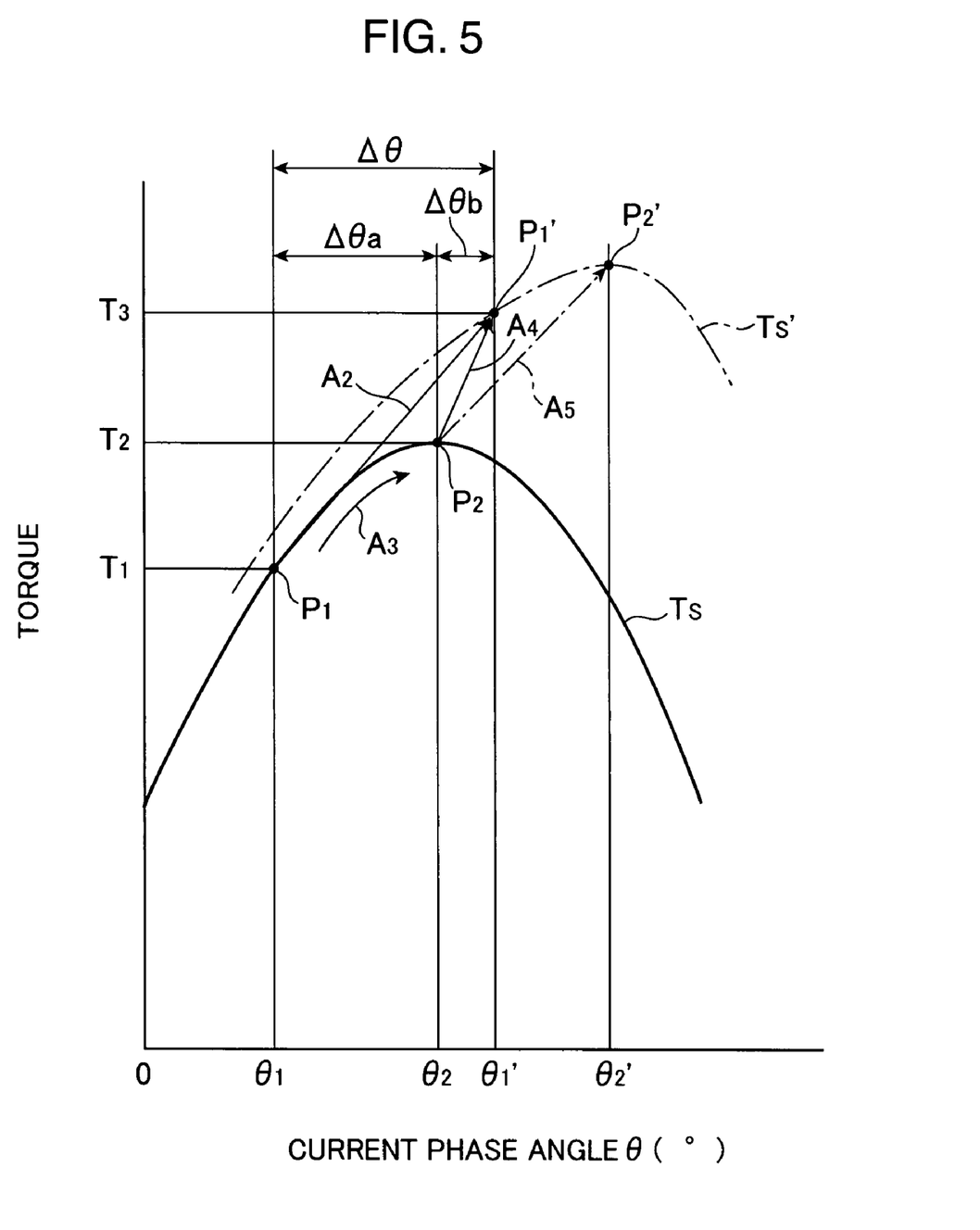
FIG. 5 is a graph for explaining a self-correction operation, which shows a part of FIG. 4 in enlarged form.

FIG. 5 is a graph for explaining the self-correction operation, which shows a part of FIG. 4 around the point $P_2$ on a motor torque curve TS in enlarged form, wherein the horizontal axis represents a current phase angle θ (°), and the vertical axis represents a torque value.

Given that the vehicle is set in the first electric energy supply mode, and initially driven under a certain condition corresponding to the point P1 on the motor torque curve TS. At the point $P_1$, the current phase angle θ=the first phase angle $\theta_1$, and the torque value=$T_1$. Then, given that a required output of the vehicle-driving motor 9 is rapidly changed from the initial driving condition to a second driving condition corresponding to a point $P_1'$ (the current phase angle $\theta$=the first phase angle $\theta_1'$, the torque value=$T_3$) on a motor torque curve TS'.

In this case, if a change speed from the point $P_1$ to the point $P_1'$ is fairly less than a change speed of an output of the engine 1, the output of the engine 1 can be changed to allow the generator 3 to generate a current with a waveform conforming to the required current waveform of the vehicle-driving motor 9, and therefore there is no need for the waveform-difference correction operation. The motor torque is slowly changed from the point $P_1$ to the point $P_1'$ generally along the path indicated by the arrow $A_2$.

In contrast, if the change speed from the point $P_1$ to the point $P_1'$ is greater than the change speed of an output of the engine 1, a waveform difference is likely to occur between the required current waveform of the vehicle-driving motor 9 and an output current waveform of the generator 3, and cause torque shock. In this embodiment, the vehicle-driving motor 9 can perform the self-correction operation to effectively suppress such torque shock.

If the shift of the motor torque from the point $P_1$ to the point $P_1'$ has a response delay, the vehicle-driving motor 9 will go into a power deficient state (torque deficient state) relative to the required output of the vehicle-driving motor 9. In this embodiment, the motor torque can be shifted from the point $P_1$ (torque=$T_1$) to the point $P_2$ (torque=$T_2$) on the same motor torque curve TS (i.e., without changing an output current waveform of the generator 3). For this purpose, the current phase angle $\theta$ may be changed from the first phase angle $\theta_1$ to the second phase angle $\theta_2$. This change is achieved in such a manner that, when a waveform difference occurs due to a response delay in the shift from the motor torque curve TS to the motor torque curve TS', the rotor 91 of the vehicle-driving motor 9 autonomously changes its rotation angle. In this specification, this autonomous change will be referred to as "self-correction".

According to the self-correction operation from the point $P_1$ to the point $P_2$, the output torque is increased from $T_1$ to $T_2$. That is, the self-correction operation can reduce a torque difference ($T_3-T_1$) in case of no self-correction operation, to ($T_3-T_2$). This makes it possible to suppress torque shock due to the large torque difference.

In conjunction with the self-correction operation, the current phase angle $\theta$ is automatically changed from the first phase angle $\theta_1$ to the second phase angle $\theta_2$. This means that the current phase angle is changed by a first change amount $\Delta\theta a$ as a part of a required change amount $\Delta\theta$, according to the self-correction operation. That is, the required current waveform of the vehicle-driving motor 9 is autonomously changed in a direction for eliminating the waveform difference (phase difference) according to the self-correction operation. As above, through the self-correction operation, the vehicle-driving motor 9 itself serves as the waveform-difference correction means.

As the result of the self-correction operation, an amount of current phase angle $\theta$ to be changed on the side of the generator 3 becomes only a second change amount $\Delta\theta b$ (=$\Delta\theta-\Delta\theta a$). That is, as compared with a case where the entire phase change amount $\Delta\theta$ is changed on the side of the generator 3, a change amount to be adjusted on the side of the generator 3 can be reduced to shorten a time required for the changing.

In the above description, the shifting process from the point $P_1$ to the point $P_1'$ has been divided into the step from the point $P_1$ to the point $P_2$ (arrow $A_3$) based on the self-correction operation, and the step from the point $P_2$ to the point $P_1'$ (arrow $A_4$) based on a change of the output waveform of the generator 3. This shifting process is not limited to the stepwise process, for example, $P_1 \rightarrow P_2 \rightarrow P_1'$, but each of the steps may be concurrently performed.

As an example to be compared with this embodiment, FIG. 4 also shows a shifting process $P_2 \rightarrow P_2'$ in the conventional technique where the current phase angle $\theta$ is set at the second phase angle $\theta_2$ (optimal current phase angle). In this case, before changing, the motor torque is set at the point $P_2$, i.e., the maximum torque $T_2$ on the motor torque curve TS. This excludes the self-correction operation. This means that the entire change from the point $P_2$ to the point $P_2'$ has to be achieved by the shifting from the motor torque curve TS to motor torque curve TS' (i.e., by the change in the output waveform of the generator 3). Moreover, the current phase angle $\theta$ has to be changed by a relatively large value ($\theta_2'-\theta_2$). Thus, as compared with this embodiment, a response delay in change of the output waveform of the generator 3 becomes larger to cause a greater risk of torque shock.

As described above, in this embodiment, the waveform-difference correction operation is divided into the amplitude correction process and the phase-difference correction process and performed in a stepwise manner. This scheme is selected in view of the fact that the characteristic of the motor torque TS is changed depending on the current amplitude, and the first phase angle $\theta_1$ is changed accordingly (see FIG. 4). Specifically, the current amplitude is first corrected to clarify the first phase angle $\theta_1$ at a value of the current so as to facilitate the subsequent phase-difference correction process to efficiently perform the waveform-difference correction operation in its entirety.

The charge/discharge-based correction operation will be described below. The charge/discharge-based correction operation is intended to charge/discharge the battery 5 so as to correct an output current waveform of the generator 3 to conform to a required current waveform of the vehicle-driving motor 9. The charge/discharge-based correction operation may be used in both the amplitude correction process and the phase-difference correction process. In this embodiment, the charge/discharge-based correction operation is used in the phase-difference correction process.

Figure 6:
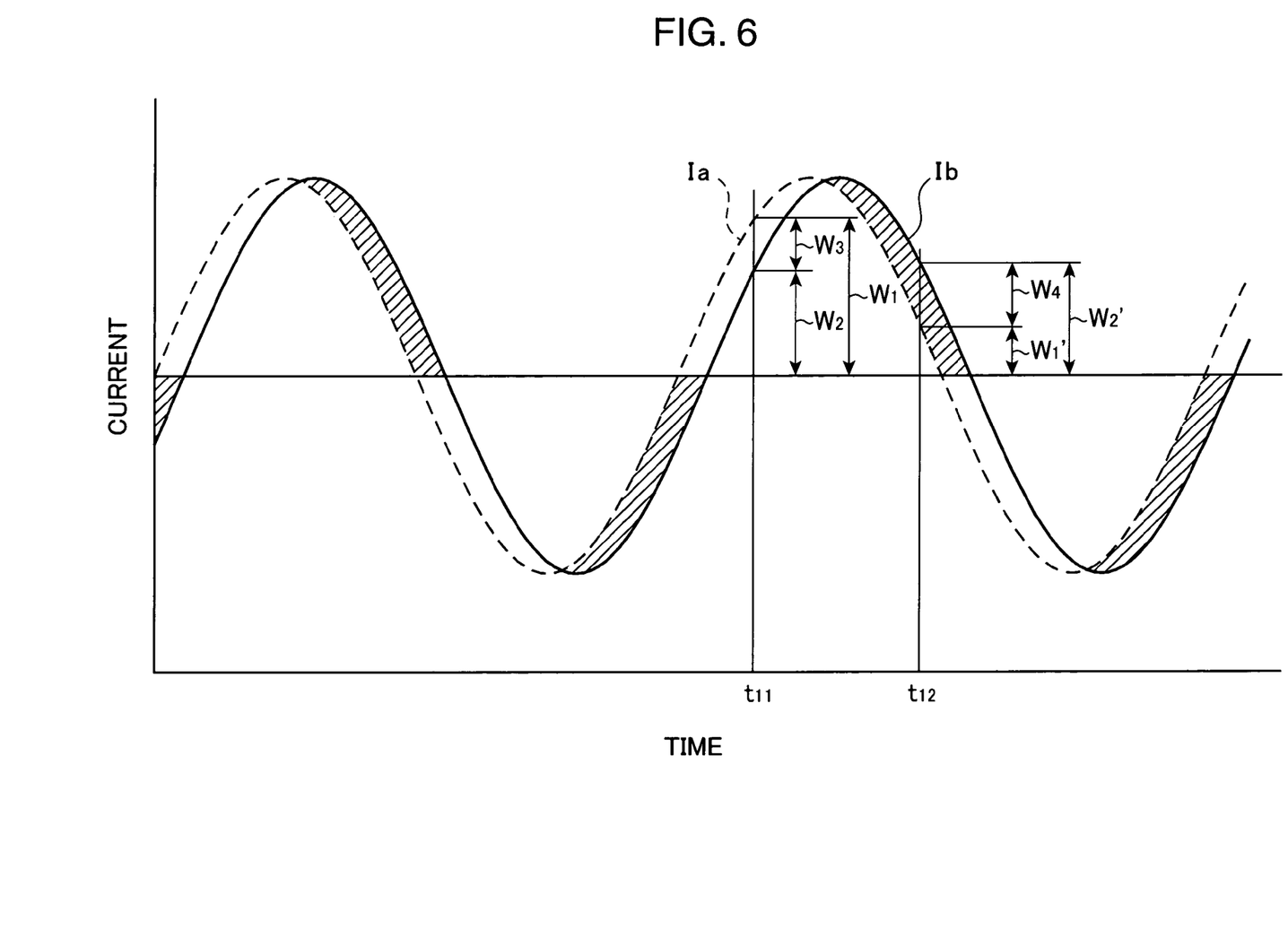
FIG. 6 is a graph for explaining a charge/discharge-based correction operation.

FIG. 6 is a graph for explaining the charge/discharge-based correction operation, wherein the horizontal axis represents a time, and the vertical axis represents a current. Further, a current waveform required for the vehicle-driving motor 9 is shown as a required current Ia indicated by the broken line, and an actual output current waveform of the generator 3 is shown as a generator output current Ib indicated by the solid line.

In the first electric energy supply mode, the generator output current Ib is basically supplied directly to the vehicle-driving motor 9. Thus, the generator output current Ib is normally adjusted to become identical to the required current Ia (i.e., to allow a waveform of the generator output current Ib to accurately conform to that of the required current Ia).

FIG. 4 shows a state when the required current Ia is rapidly changed, for example, due to a change in a required output of the vehicle-driving motor 9, and a response delay in change of the generator output current Ib occurs to cause a current waveform mismatch (waveform difference).

The charge/discharge-based correction operation for eliminating the waveform difference is performed as follows. When the generator output current Ib has an absolute value less than that of the required current Ia, an electric energy is discharged from the battery 5 and added to the generator output current Ib to correct the generator output current Ib to be increased. Conversely, when the generator output current Ib has a large absolute value relative to the required current Ia, a part of the generator output current Ib is charged into the battery 5 to correct the generator output current Ib to be reduced.

More specifically, the waveform-difference correction section 24 of the PCM 20 instructs the battery controller 6 to charge/discharge the battery 5 so as to subject the generator output current Ib to the waveform-difference correction operation to correct the generator output current Ib to have a waveform as close to that of the required current Ia as possible, and then supply the obtained generator output current Ib to the vehicle-driving motor 9. Thus, in the charge/discharge-based correction operation, the waveform-difference correction section 24, the battery 5 and the battery controller 6 serve as the waveform-difference correction means.

For example, at a time $t_{11}$, the generator output current Ib has an absolute value $W_2$ which is less than an absolute value $W_1$ of the required current Ia by $W_3$ (deficient). Thus, the battery controller 6 operates to discharge the battery 5 by $W_3$ and add the discharge amount $W_3$ to the generator output current Ib. As a result, (supply current $W_1$)=(generated eclectic energy $W_2$)+(discharge amount $W_3$), as in the aforementioned Formula 1, so that a current equal to the required current Ia of the vehicle-driving motor 9 can be supplied.

At a time $t_{12}$, the generator output current Ib has an absolute value $W_2$' which is greater than an absolute value $W_1$' of the required current Ia by $W_4$ (excess). Thus, the battery controller 6 operates to charge the battery 5 by the excess amount $W_4$. As a result, (supply current $W_1$')=(generated eclectic energy $W_2$')−(charge amount $W_4$), as in the aforementioned Formula 2, so that a current equal to the required current Ia of the vehicle-driving motor 9 can be supplied.

Actually, the above operation is not limited to the time $t_{11}$ and the time $t_{12}$, but continuously performed in the entire region of the charge/discharge-based correction operation. In FIG. 6, a region of |generator output current Ib|>|required current Ia| i.e., the charging region, is indicated by the shaded area. The discharging operation is performed in the remaining region of |generator output current Ib|<|required current Ia|.

Figure 7:
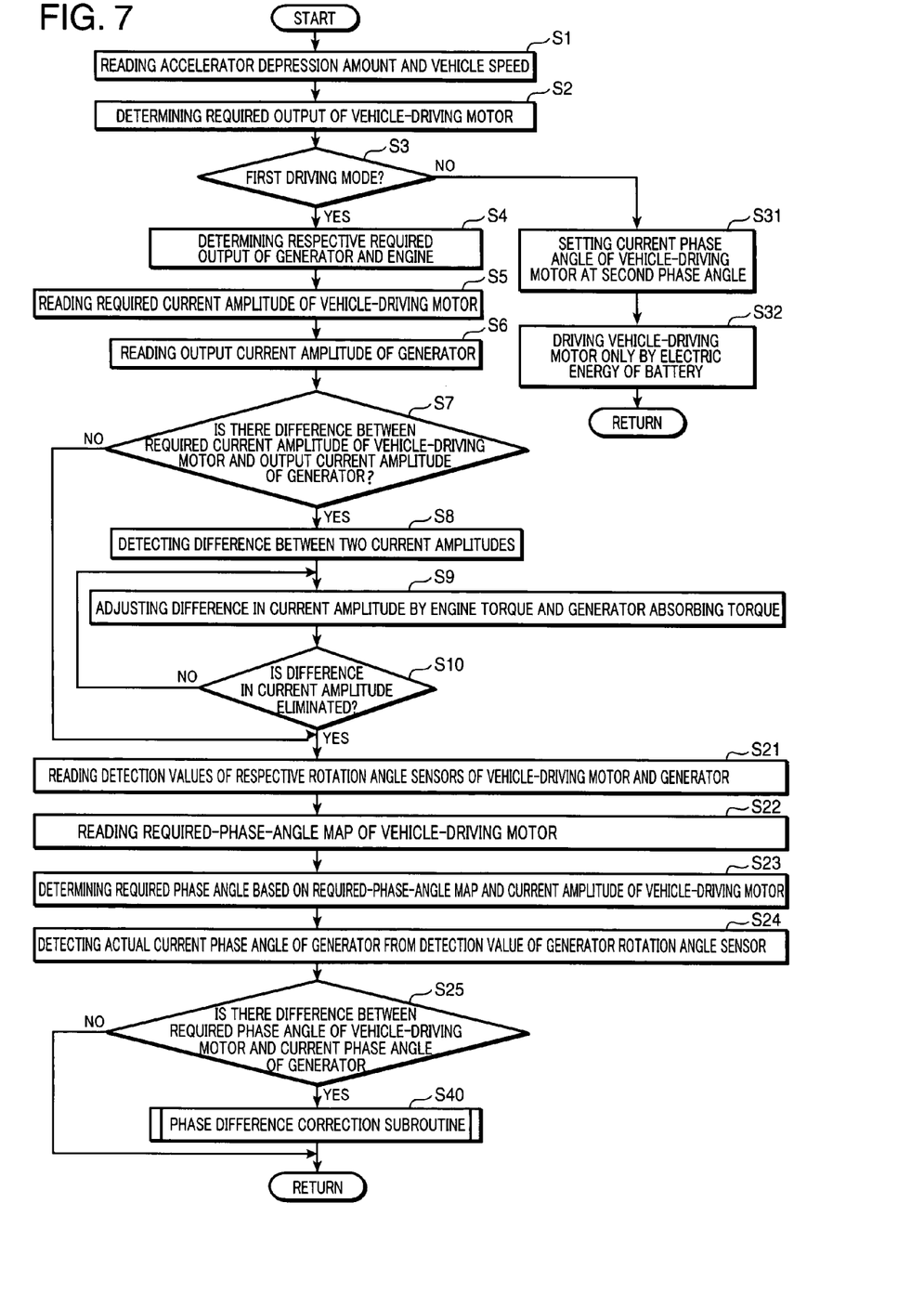
FIG. 7 is a schematic flowchart showing a control process including a waveform-difference correction operation.

While the above description has been made based on one example where the required current Ia and the generator output current Ib are the same in amplitude and frequency, but different only in phase, as illustrated in FIG. 7, the charge/discharge-based correction operation can be applied to other cases where the required current Ia and the generator output current Ib have different amplitudes and/or frequencies.

The reset correction operation will be described below. The reset correction operation is intended to momentarily stop supply of electric energy to the vehicle-driving motor 9 and then restart the supply. The reset correction operation can be simultaneously used in the amplitude correction process and the phase-difference correction process. In this embodiment, the reset correction operation is used in the phase-difference correction process.

Specifically, the waveform-difference correction section 24 operates to turn off the switch 8 (see FIG. 1) for a short time of period so as to momentarily stop supply of electric energy to the vehicle-driving motor 9. Then, the waveform-difference correction section 24 operates to turn on the switch 8 in such a manner as to restart supply of electric energy to the vehicle-driving motor 9 at a timing allowing a current phase of the vehicle-driving motor 9 to be synchronized with that of the generator 3. In this manner, a current waveform of the vehicle-driving motor 9 can be corrected to conform to a current waveform of the generator 3.

Differently from the self-correction operation and the charge/discharge-based correction operation which are designed to correct an output current waveform of the generator 3 to conform to a required current waveform of the vehicle-driving motor 9, the reset correction operation is designed to correct a current waveform of the vehicle-driving motor 9 to conform to an output current waveform of the generator 3. Thus, after the correction, a current waveform supplied to the vehicle-driving motor 9 does not always conform to a required current waveform of the vehicle-driving motor 9. Thus, the reset correction operation is capable of contributing to quick elimination of a waveform difference, but not up to the self-correction operation and the charge/discharge-based correction operation in terms of suppression of torque shock.

However, the reset correction operation has an advantage of having no limitation in correctable phase difference and no energy loss due to charging/discarding to/from the battery 5.

With a view to utilizing this advantage, in this embodiment, if the self-correction operation or the charge/discharge-based correction operation can be adequately or effectively used, these correction operations are used by propriety. If not, the reset correction operation is used as backup means.

As above, the elements of the waveform-difference correction operation have been described individually. A pattern of the use of these elementary operations can be summarized as follows.

As a first step of the waveform-difference correction operation, the amplitude correction process based on the electric energy amount correction operation is performed. As a second step, the phase-difference correction process is performed based on a combination of the self-correction operation and the charge/discharge-based correction operation. Specifically, when a deviation in current phase angle falls within an effective range of the self-correction operation, only the self-correction operation is performed. When the deviation is out of the effective range of the self-correction operation, the charge/discharge-based correction operation is performed to correct the deviation at a value falling with the effective range of the self-correction operation, and then the self-correction operation is performed while performing the charge/discharge-based correction operation as a means of supplementing the self-correction operation.

If the deviation of current phase angle is out of the effective range of the self-correction operation, and a storage amount of the battery 5 is less than a predetermined value, none of the self-correction operation and the charge/discharge-based correction operation is effectively used. Thus, the reset correction operation is performed in place of the self-correction operation and the charge/discharge-based correction operation.

The above description has been made about an operation in the first electric energy supply mode in the first driving range. As mentioned above, in the first electric energy supply mode, an AC generated by the generator 3 is directly supplied to the vehicle-driving motor 9 without energy loss due to passing of the inverter/converter 4, so as to provide enhanced fuel economy.

Further, in the first electric energy supply mode, if a waveform difference between a current waveform required for the vehicle-driving motor 9 and an output current waveform of the generator 3 occurs due to a change in required output of the vehicle-driving motor 9, the waveform-difference correction is performed in a direction for eliminating the waveform difference. Thus, the transitional waveform difference can be quickly eliminated to suppress a negative effect due to the waveform difference, i.e., response delay.

The respective elements of the waveform-difference correction operation have the aforementioned individual advantages. In particular, a combination of the self-correction operation and the charge/discharge-based correction operation can be used in the phase-difference correction process to further quickly eliminate the waveform difference while suppressing energy loss due to charging/discharging of the battery 5.

An operation in the second electric energy supply mode to be selected in a low vehicle power range (second driving range) where a power required for the vehicle (road wheels 13) is less than that in the first driving range will be described below.

In the second electric energy supply mode, an electric energy is supplied only from the battery 5 to the vehicle-driving motor 9. Specifically, an electric energy stored in the battery 5 is discharged and supplied to the vehicle-driving motor 9 through the inverter/converter 4 and the generator 3 (in the same manner as that in a conventional electric vehicle)

The second electric energy supply mode can be selected in the low vehicle power range, i.e., the second driving range, to eliminate the need for operating the engine 1 at a low output so as to effectively avoid deterioration in combustion efficiency due to the low output operation of the engine to achieve enhanced fuel economy.

In the second electric energy supply mode, the current phase angle $\theta$ is set at the second phase angle $\theta_2$, as mentioned above. This makes it possible to set an output torque of the vehicle-driving motor 9 at a maximum torque for a supplied current value so as to provide enhanced efficiency.

FIG. 7 is a schematic flowchart showing a control process including the waveform-difference correction operation, in the PCM 20. Upon starting this processing routine, an accelerator depression amount detected by the accelerator depression amount sensor 15 and a vehicle speed detected by the vehicle speed sensor 16 are read to calculate a required vehicle power (Step S1). Then, the required motor output determination section 21 determines the required vehicle power based on the accelerator depression amount and the vehicle speed, and determines a required output, i.e., required torque, of the vehicle-driving motor 9 in conformity to the required vehicle power (Step S2).

Then, based on the required output of the vehicle-driving motor 9, it is determined whether an actual driving range is the first driving range (Step S3). If the determination in Step S3 is YES, or the actual driving range is the first driving range, the processing routine advances to Step S4, and a processing for the first electric energy supply mode will be performed.

In Step S4, the required generator output determination section 22 determines a required output of the generator 3 in conformity to the required output of the vehicle-driving motor 9, and the required engine output determination section 23 determines a required output of the engine 1 in conformity to the required output of the generator 3. Further, based on the determined values, the throttle valve 1a of the engine 1 is adjusted, and an electric energy amount to be generated by the generator 3 is adjusted by the generator torque controller 3a.

Then, a required current amplitude of the vehicle-driving motor 9 is read from the required output of the vehicle-driving motor 9 (Step S5). Further, an amplitude of an output current of the generator 3 is read from a detection value of the generator current sensor 3c (Step S6). Then, it is determined whether there is a difference between the required current amplitude of the vehicle-driving motor 9 and the output current amplitude of the generator 3 (Step S7).

If the determination in Step S7 is YES, the processing routine advances to the amplitude correction process as the first step of the waveform-difference correction operation. In the amplitude correction process, a difference between the above current amplitudes is detected (Step S8). Then, the waveform-difference correction section 24 performs the waveform-difference correction operation about amplitude to eliminate the difference between the current amplitudes. Specifically, the waveform-difference correction section 24 instructs the generator torque controller 3a to adjust an electric energy to be generated by the generator 3 (engine torque to be absorbed) while adjusting the throttle valve 1a to control an engine torque (Step S9).

Then, when the difference between the current amplitudes is eliminated (YES in Step S10), the amplitude correction process is terminated, and the processing routine advances to Step S21. If the determination in Step S7 is NO (there is no difference between the current amplitudes before the amplitude correction process), the processing routine advances to Step S21 while skipping Steps S8 to S10.

In Step S21, a detection value of the motor rotation angle sensor 9a and a detection value of the generator rotation angle sensor 3b are read. Subsequently, a pre-stored map about a required phase angle of the vehicle-driving motor 9 is read (Step S22). Then, a required phase angle is determined based on the required-phase-angle map and the current amplitude of the vehicle-driving motor 9 which has already be corrected to conform to the output current amplitude of the generator 3 (Step S23). Further, an actual current phase angle of the generator 3 is detected by the generator rotation angle sensor 3b (Step S24). Then, it is determined whether there is a phase difference between the required phase angle of the vehicle-driving motor 9 and the actual current phase angle of the generator 3 (Step S25).

If the determination in Step S25 is YES, the processing routine is shifted to a phase-difference correction subroutine for eliminating the phase difference (Step S40). If the determination in Step S25 is NO, i.e., there is no phase difference, it is finally determined that the current waveforms are identical to each other because the current amplitudes have been corrected to conform to each other. Thus, the waveform-difference correction operation is completed to return to an original engine control routine.

If the determination in Step S3 is NO, i.e., the current driving range is a low vehicle power range (second driving range), a processing for the second electric energy supply mode is performed. First of all, the motor torque controller 9a sets the current phase angle at the second phase angle (optimal current phase angle) (Step S31). Then, the vehicle-driving motor 9 is driven only by an electric energy of the battery (Step S32), and the processing routine returned to the original engine control routine.

Figure 8:
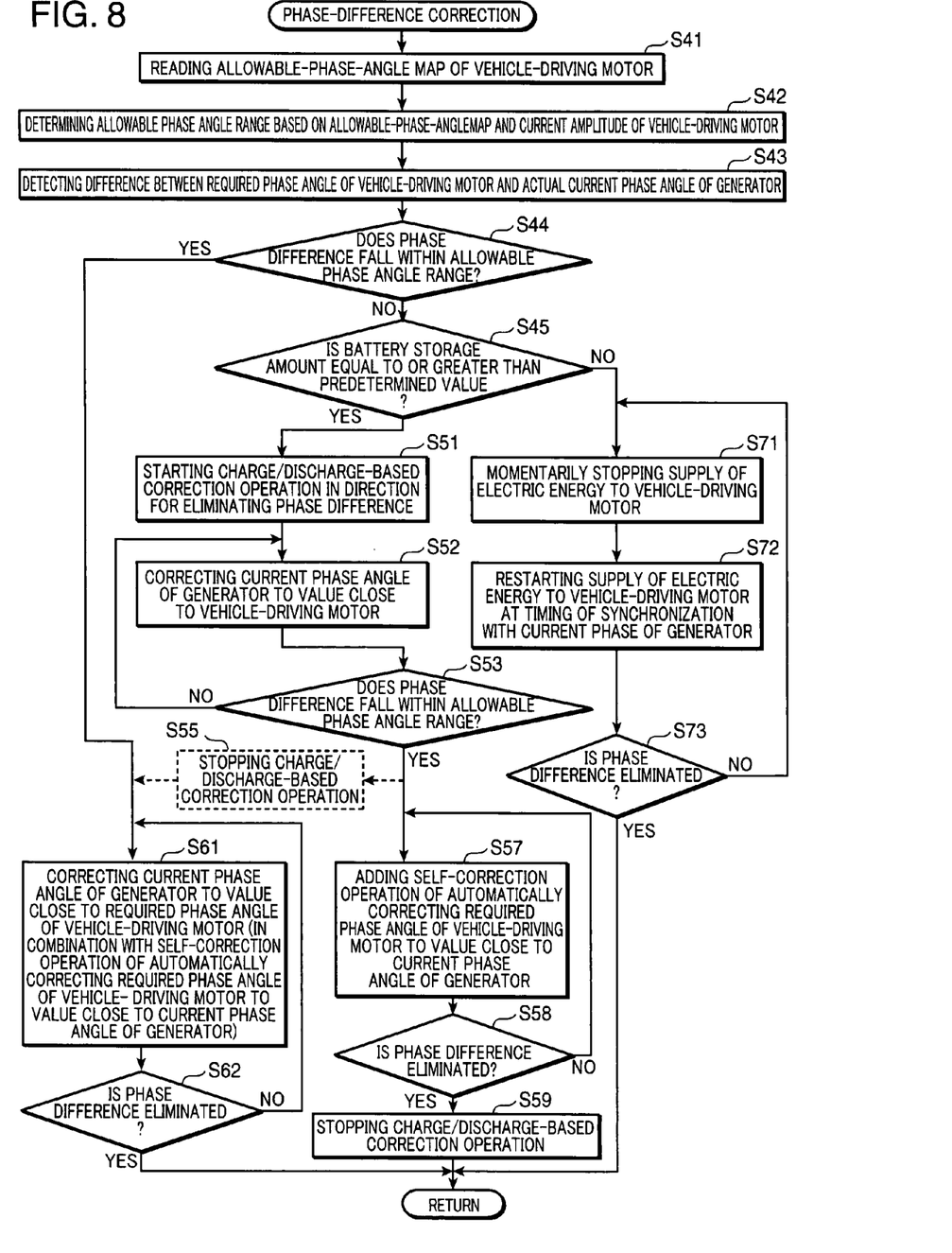
FIG. 8 is a flowchart showing a subroutine of the waveform-difference correction operation in FIG. 7.

FIG. 8 is a flowchart showing the of the phase-difference correction subroutine in Step S40 of FIG. 7. Upon starting this processing subroutine, a map about an allowable phase angle of the vehicle-driving motor 9 is read (Step S41). The allowable-phase-angle map is prepared by organize a relation between an allowable phase angle range (Ok in FIG. 4) and a current amplitude, in the form of a map, and pre-stored.

Then, an allowable phase angle range is determined based on a current amplitude of the vehicle-driving motor 9 and the allowable-phase-angle map (Step S42). Further, a difference between a required phase angle of the vehicle-driving motor 9 and an actual current phase angle of the generator 3 (i.e., the phase difference determined in Step S25 of FIG. 7) (Step S43). Then, it is determined whether the detected phase difference falls within the allowable phase angle range (Step S44).

If the determination in Step S44 is YES, or the phase difference falls with in an effective range of the self-correction operation, the self-correction operation is autonomously performed (corresponding to the arrow A3 in FIG. 5). In concurrence with the self-correction operation, the current phase angle of the generator 3 is corrected to a value close to the required phase angle of the vehicle-driving motor 9 (corresponding to the arrow A4 in FIG. 5) (Step S61). Specifically, the throttle valve 1*a* is adjusted to increase or reduce a rotation speed of the engine 1 (i.e., engine speed) so as to adjust the current phase angle of the generator 3. If the phase difference is relatively small (for example, when $\theta_1 < \theta_1' < \theta_2$ in FIG. 5), the phase difference can be almost corrected only by the self-correction operation. After the phase difference is eliminated (YES in Step S62), the phase-difference correction subroutine is terminated to return to the processing routine or the original engine control routine.

When the determination in Step S44 is NO, it means that the actual current phase angle is out of the effective range of the self-correction operation, and the self-correction is not immediately performed. Thus, it is determined whether a storage amount of the buttery is equal to or greater than a predetermined value (i.e., a storage value enough to perform the charge/discharge-based correction operation (Step S45). If the determination in Step S45 is YES, the charge/discharge-based correction operation is started in the direction for eliminating the phase difference (Step S51). Concurrently, the current phase angle of the generator 3 is moved to a value close to the required phase angle of the vehicle-driving motor 9 (Step S52). Specifically, the throttle valve 1*a* is adjusted to increase or reduce the engine speed so as to adjust the current phase angle of the generator 3.

When the phase difference is reduced to a value falling within the allowable phase difference range $\theta$k (YES in Step S53), the self-correction operation is autonomously performed (Step S57). That is, the charge/discharge-based correction operation and the self-correction operation are concurrently performed, i.e., performed in combination. After the phase difference is eliminated (YES in Step S58), the charge/discharge-based correction operation is stopped (Step S59), and the phase-difference correction subroutine is terminated to return to the processing routine or the original engine control routine.

If the determination in Step S45 is NO, i.e., the storage amount of the battery is insufficient, the reset correction operation is performed instead of the charge/discharge-based correction operation. Specifically, the switch 8 is turned off for a short time of period to momentarily stop supply of electric energy to the vehicle-driving motor 9 (Step S71). Then, the switch 8 is turned on to restart supply of electric energy to the vehicle-driving motor 9 at a timing allowing a current phase of the vehicle-driving motor 9 to be synchronized with that of the generator 3. In this manner, a current waveform of the vehicle-driving motor 9 can be corrected to conform to a current waveform of the generator 3 (Step S72). After the phase difference is eliminated (YES in Step S73), the phase-difference correction subroutine is terminated to return to the processing routine or the original engine control routine.

An example of modification of the above embodiment will be described below. As compared with the above embodiment, the following modification is different in a pattern of combination of the self-correction operation and the charge/discharge-based correction operation. Specifically, in the phase-difference correction process, if a deviation in current phase angle is out of the effective range of the self-correction operation, the charge/discharge-based correction operation is first performed. Then, when the deviation is corrected to a value falling within the effective range of the self-correction operation, the charge/discharge-based correction operation is stopped, and the phase-difference correction process is switched to and performed only by the self-correction operation. Specifically, in the phase-difference correction subroutine illustrated in FIG. 8, when the determination in Step S53 is YES, the processing subroutine advances to Step S55. After stopping the charge/discharge-based correction operation in Step S55, the processing subroutine advances to Step S61 so as to perform the self-correction operation.

This modification makes it possible to reduce a frequency of the charge/discharge-based correction operation as compared with the above embodiment so as to further suppress the energy loss due to the charge/discharge-based correction operation.

As above, while the present invention has been described based on a specific embodiment thereof, various modifications and changes may be made without departing from the spirit and scope of the present invention. For example, while the hybrid vehicle control system according to the above embodiment employs the IPM synchronous motor as a vehicle-driving motor 9, the vehicle-driving motor 9 is not limited to the IPM synchronous motor, but any other suitable type of vehicle-driving motor having a self-correction function may be used to obtain the same advantages from a self-correction operation.

Alternatively, a type having no self-correction function may also be used as the vehicle-driving motor 9. In this case, in the phase-difference correction subroutine illustrated in FIG. 8, the steps for the self-correction operation may be omitted, and the charge/discharge-based correction operation and the reset correction operation may be performed when the battery storage amount is equal to or greater than the predetermined value and when the battery storage amount is less than the predetermined value, respectively.

In this case, the charge/discharge-based correction operation may also be used in the amplitude correction process without dividing the waveform-difference correction operation into the first and second steps, i.e., the amplitude correction process and phase-difference correction process.

As mentioned above, the present invention provides a control system for a hybrid vehicle which includes a generator adapted to be driven by an internal combustion engine, and a vehicle-driving motor adapted to drive road wheels, and has a first electric energy supply mode for directly supplying an alternating current generated by the generator, to the vehicle-driving motor. The control system comprises required motor output determination section operable to determine a required output of the vehicle-driving motor in conformity to a required vehicle power, required generator output determination section operable to determine a required output of the generator in conformity to the required output of the vehicle-driving motor, required engine output determination section operable to determine a required output of the engine in conformity to the required output of the generator, and waveform-difference correction section operable, in response to occurrence of a waveform difference between a current waveform required for the vehicle-driving motor and an output current waveform of the generator, due to a change in the required output of the vehicle-driving motor, to perform a waveform-difference correction operation in a direction for eliminating the waveform difference.

In the hybrid vehicle control system of the present invention, in the first electric energy supply mode, an AC generated by the generator is directly supplied to the vehicle-driving motor to eliminate energy loss due to passing of an inverter and/or a converter so as to achieve enhanced fuel economy.

Further, if a waveform difference between a current waveform required for the vehicle-driving motor and an output current waveform of the generator, due to a change in the required output of the vehicle-driving motor occurs in the first electric energy supply mode, the waveform-difference correction operation is performed in direction for eliminating the waveform difference. Thus, the transitional waveform difference can be quickly eliminated to suppress a negative effect due to the waveform difference, i.e., response delay.

In a preferred embodiment of the present invention, the hybrid vehicle includes: a battery adapted to store an electric energy generated by the generator and charged thereinto through an inverter, and discharge the stored electric energy to the vehicle-driving motor through the inverter; and battery controller operable to control the charging/discharging of the battery. In this case, the waveform-difference correction operation may include a charge/discharge-based correction operation in which the battery controller operates to allow the battery to be charged/discharged in the direction for eliminating the waveform difference, so as to serve as at least a part of the waveform-difference correction section.

According to this hybrid vehicle control system, the charge/discharge-based correction operation makes it possible to quickly correct the waveform difference and effectively suppress torque shock due to the waveform difference. For example, when an output current of the generator has an absolute value greater than that of a required current of the vehicle-driving motor for a moment, the difference (excess part) can be reduced by charging the battery so as to supply a current to the vehicle-driving motor in an amount equal to the required current of the vehicle-driving motor. Conversely, when an output current of the generator has an absolute value less than that of the required current of the vehicle-driving motor, the difference (deficient part) can be complement by discharging the battery so as to supply a current to the vehicle-driving motor in an amount equal to the required current of the vehicle-driving motor. The charge/discharge-based correction operation can continuously perform the charging/discharging to thereby supply a current to the vehicle-driving motor in the same current waveform as a required current waveform of the vehicle-driving motor.

In addition, the charge/discharge-based correction operation is designed to correct the current waveform of the generator to conform to the required current waveform of the vehicle-driving motor, so as to allow the vehicle-driving motor to quickly output a required driving force (torque). This makes it possible to effectively suppress torque shock which otherwise occurs when an actual output of the vehicle-driving motor is deviated from the required driving force due to a waveform difference.

In a preferred embodiment of the present invention, the vehicle-driving motor has a structure in which a permanent magnet is embedded in a rotor to allow a magnet torque and a reluctance torque to be generated variably depending on a current phase angle, and includes phase-angle setting section operable, when the vehicle-driving motor is driven in the first electric energy supply mode, to set the current phase angle at a first phase angle which is shifted by a predetermined value from a second phase angle where a sum of the magnet torque and the reluctance torque is maximized. In this case, the waveform-difference correction operation may include a self-correction operation in which, when the current phase angle is deviated from the first phase angle due to the occurrence of the waveform difference, the vehicle-driving motor autonomously operates to shift the deviated current phase angle in a direction for returning to the first phase angle, so as to serve as at least a part of the waveform-difference correction section.

According to this hybrid vehicle control system, a waveform difference can be automatically and quickly corrected based on the self-correction operation of the vehicle-driving motor to effectively suppress torque shock without imposing a load on the battery.

The self-correction operation can autonomously correct a waveform difference without the need for changing a current waveform to be supplied to the vehicle-driving motor. Thus, even if the change of the current waveform to be supplied to the vehicle-driving motor is delayed, the waveform difference can be quickly corrected. Further, in the self-correction operation, the vehicle-driving motor autonomously changes its current phase angle to allow a current waveform of the generator to relatively conform to the required current waveform of the vehicle-driving motor. Thus, the vehicle-driving motor can quickly output a required driving force (torque). This makes it possible to effectively suppress torque shock which otherwise-occurs when an actual output of the vehicle-driving motor is deviated from the required driving force due to a waveform difference.

In addition, as compared with the charge/discharge-based correction operation, the self-correction operation has an advantage in terms of efficiency because of no energy loss due to charging/discharging of the battery.

However, a current phase angle effective to the self-correction operation is limited to a certain range (effective range of the self-correction operation), and thereby a correctable value by the self-correction operation has a certain limit. Thus, another type of waveform-difference correction operation usable regardless of the effective range of the self-correction operation may be used in combination with the self-correction operation to extend an effective range of the waveform-difference correction operation in its entirety so as more effectively eliminate a waveform difference.

In the above preferred embodiment, when the hybrid vehicle includes a battery adapted to store an electric energy generated by the generator and charged thereinto through an inverter, and discharge the stored electric energy to the vehicle-driving motor through the inverter; and battery controller operable to control the charging/discharging of the battery, the waveform-difference correction operation may further include a charge/discharge-based correction operation in which the battery controller allows the battery to be charged/discharged in the direction for eliminating the waveform difference, so as to serve as a part of the waveform-difference correction section. In this case, the self-correction operation is selected as the waveform-difference correction operation, when the deviation of the current phase angle falls within an effective range of the self-correction operation, and the charge/discharge-based correction operation is selected as the waveform-difference correction operation, when the deviation of the current phase angle is out of the effective range of the self-correction operation.

According to this hybrid vehicle control system, the self-correction operation and the charge/discharge-based correction operation can be selectively used depending on effectiveness of the self-correction operation to correct a waveform difference in a wider range while suppressing energy loss due to charging/discharging of the battery.

Alternatively, when the hybrid vehicle includes: a battery adapted to store an electric energy generated by the generator and charged thereinto through an inverter, and discharge the stored electric energy to the vehicle-driving motor through the inverter; and battery controller operable to control the charging/discharging of the battery, the waveform-difference correction operation may further include a charge/discharge-based correction operation in which the battery controller allows the battery to be charged/discharged in the direction for eliminating the waveform difference, so as to serve as a part of the waveform-difference correction section, and the waveform-difference correction operation may be performed as a combination of the self-correction operation and the charge/discharge-based correction operation.

According to this hybrid vehicle control system, the self-correction operation and the charge/discharge-based correction operation can be used in combination to quickly correct a waveform difference while minimizing a frequency of charging/discharging of the battery. As used in this specification, the term "combination" means the following three schemes: a first scheme where the self-correction operation and the charge/discharge-based correction operation are sequentially performed; a second scheme where the self-correction operation and the charge/discharge-based correction operation are simultaneously performed; and a third scheme where the self-correction operation and the charge/discharge-based correction operation are partially simultaneously performed while being sequentially performed.

In the sequential scheme, for example, when a deviation of the current phase angle is out of the effective range of the self-correction operation, the charge/discharge-based correction operation may be performed to correct the deviation to a value falling within the effective range, and then the self-correction operation may be performed in place of the charge/discharge-based correction operation. In this case, as compared with a scheme where a waveform difference is corrected only by the charge/discharge-based correction operation, the energy loss due to charging/discharging of the battery can be advantageously reduced.

In the simultaneous scheme, for example, when a deviation of the current phase angle falls within the effective range of the self-correction operation, the self-correction operation is performed, and the charge/discharge-based correction operation may be performed in a complementary manner. In this case, as compared with a scheme where a waveform difference is corrected only by the self-correction operation, the waveform difference can be more quickly corrected to advantageously suppress torque shock in a more reliable manner.

In the sequential and partially simultaneous scheme, the charge/discharge-based correction operation may be performed to correct a deviation to a value falling within the effective range, and then the self-correction operation may be performed while performing the charge/discharge-based correction operation in a complementary manner. In this case, the advantages of the first and second schemes can be obtained.

In the above preferred embodiment, when the hybrid vehicle includes a battery adapted to store an electric energy generated by the generator and charged thereinto through an inverter, and discharge the stored electric energy to the vehicle-driving motor through the inverter, and further has a second electric energy supply mode for supplying a driving electric energy only from the battery to the vehicle driving motor, the control system may be operable, in a predetermined medium-to-high vehicle power range, to select the first electric energy supply mode, and, in a low vehicle power range relative to the medium/high vehicle power range, to select the second electric energy supply mode, and the phase-angle setting section may be operable, in the second electric energy supply mode, to set the current phase angle at the second phase angle.

According to this hybrid vehicle control system, the second electric energy supply mode for supplying an electric energy only from the battery to the vehicle driving motor in the low vehicle power range. This makes it possible to eliminate the need for operating the engine at a low output so as to effectively avoid deterioration in combustion efficiency due to the low output operation of the engine to achieve enhanced fuel economy.

Further, in the second electric energy supply mode, the current phase angle can be set at the second phase angle. This makes it possible to set an output torque of the vehicle-driving motor at a maximum torque for a supplied current value so as to provide enhanced efficiency. In the second electric energy supply mode, an electric energy may be extracted from the battery in a state after being adjusted to conform to a current waveform required for the vehicle-driving motor through an inverter and/or converter. Thus, there is no particular need for a positive waveform-difference correction operation (i.e., an intentional waveform-difference correction operation except for an autonomous waveform-difference correction operation or the like).

This application is based on Japanese Patent Application Serial No. 2006-227725 filed in Japan Patent Office on Aug. 24, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control system for a hybrid vehicle, said hybrid vehicle including a generator adapted to be driven by an internal combustion engine, and a vehicle-driving motor adapted to drive road wheels, and having a first electric energy supply mode for directly supplying an alternating current generated by said generator, to said vehicle-driving motor, said control system comprising:

required motor output determination section operable to determine a required output of said vehicle-driving motor in conformity to a required vehicle power;

required generator output determination section operable to determine a required output of said generator in conformity to said required output of said vehicle-driving motor;

required engine output determination section operable to determine a required output of said engine in conformity to said required output of said generator; and waveform-difference correction section operable, in response to occurrence of a waveform difference between a current waveform required for said vehicle-driving motor and an output current waveform of said generator due to a change in said required output of said vehicle-driving motor, to perform a waveform-difference correction operation in a direction for eliminating said waveform difference;

wherein said vehicle-driving motor includes a permanent magnet embedded in a rotor to allow a magnet torque and a reluctance torque to be generated variably depending on a current phase angle, and includes phase-angle setting section operable, when said vehicle-driving motor is driven in said first electric energy supply mode, to set said current phase angle at a first phase angle which is shifted by a predetermined value from a second phase angle where a sum of said magnet torque and said reluctance torque is maximized, and wherein said waveform-difference correction operation includes a self-correction operation in which, when said current phase angle is deviated from said first phase angle due to the occurrence of said waveform difference, said vehicle-driving motor autonomously operates to shift said deviated current phase angle in a direction for returning to said first phase angle, so as to serve as at least a part of said waveform-difference correction section.

2. The control system as defined in claim 1, wherein said hybrid vehicle includes a battery adapted to store an electric energy generated by said generator and charged thereinto through an inverter, and discharge the stored electric energy to said vehicle-driving motor through said inverter; and said control system further comprising a battery controller operable to control said charging/discharging of said battery, wherein said waveform-difference correction operation includes a charge/discharge-based correction operation in which said battery controller allows said battery to be charged/discharged in the direction for eliminating said waveform difference, so as to serve as a part of said waveform-difference correction section, wherein said self-correction operation is selected as said waveform-difference correction operation, when said deviation of said current phase angle falls within an effective range of said self-correction operation; and said charge/discharge-based correction operation is selected as said waveform-difference correction operation, when said deviation of said current phase angle is out of said effective range of said self-correction operation.

3. The control system as defined in claim 1, wherein said hybrid vehicle includes a battery adapted to store an electric energy generated by said generator and charged thereinto through an inverter, and discharge the stored electric energy to said vehicle-driving motor through said inverter; and said control system further comprising a battery controller operable to control said charging/discharging of said battery, wherein said waveform-difference correction operation includes a charge/discharge-based correction operation in which said battery controller allows said battery to be charged/discharged in the direction for eliminating said waveform difference, so as to serve as a part of said waveform-difference correction section, and wherein said waveform-difference correction operation is performed as a combination of said self-correction operation and said charge/discharge-based correction operation.

4. The control system as defined in claim 1, wherein said hybrid vehicle includes a battery adapted to store an electric energy generated by said generator and charged thereinto through an inverter, and discharge the stored electric energy to said vehicle-driving motor through said inverter, and has a second electric energy supply mode for supplying a driving electric energy only from said battery to said vehicle driving motor, wherein:

said control system is operable, in a predetermined medium-to-high vehicle power range, to select said first electric energy supply mode, and, in a low vehicle power range relative to said medium/high vehicle power range, to select said second electric energy supply mode; and said phase-angle setting section is operable, in said second electric energy supply mode, to set said current phase angle at said second phase angle.

* * * * *